US009587330B2

(12) United States Patent
Sémelas Ledesma

(10) Patent No.: US 9,587,330 B2

(45) Date of Patent: Mar. 7, 2017

(54) METHOD FOR MANUFACTURING STRUCTURAL SYNTHETIC FIBERS FOR CONCRETES AND MORTARS AND THE SYNTHETIC FIBER OBTAINED

(71) Applicant: MYPHOR MATERIALES ESPECIALES, S.L., Madrid (ES)

(72) Inventor: Gabriel Sémelas Ledesma, Madrid (ES)

(73) Assignee: MYPHOR MATERIALES ESPECIALES, S.L., Madrid (ES)

( * ) Notice: Subject to any disclaimer, the term of this patent is extended or adjusted under 35 U.S.C. 154(b) by 0 days.

(21) Appl. No.: 14/907,205

(22) PCT Filed: Jul. 23, 2014

(86) PCT No.: PCT/ES2014/070589

§ 371 (c)(1),
(2) Date: Jan. 22, 2016

(87) PCT Pub. No.: WO2015/011324

PCT Pub. Date: Jan. 29, 2015

(65) Prior Publication Data

US 2016/0145773 A1 May 26, 2016

(30) Foreign Application Priority Data

Jul. 23, 2013 (ES) .................................. 201331123

(51) Int. Cl.

| | |
|---|---|
| ***D01F 6/04*** | (2006.01) |
| ***D01D 5/16*** | (2006.01) |
| ***D01D 10/02*** | (2006.01) |
| ***D01F 11/06*** | (2006.01) |
| ***C04B 16/06*** | (2006.01) |
| ***C04B 24/26*** | (2006.01) |
| *E04C 5/07* | (2006.01) |

(52) U.S. Cl.

CPC ........... *D01F 6/04* (2013.01); *C04B 16/0625* (2013.01); *C04B 24/2611* (2013.01); *D01D 5/16* (2013.01); *D01D 10/02* (2013.01); *D01F 11/06* (2013.01); *D10B 2321/02* (2013.01); *D10B 2505/20* (2013.01); *E04C 5/073* (2013.01)

(58) Field of Classification Search

CPC .. D01F 6/04; D01F 11/06; D01D 5/16; D01D 10/02
USPC ........................................... 216/52; 524/570
See application file for complete search history.

(56) References Cited

U.S. PATENT DOCUMENTS 4,483,727 A 11/1984 Eickman et al.
2003/0038398 A1* 2/2003 Ohta ...................... B28B 23/06 264/228
2010/0173547 A1 7/2010 Katayama et al.

FOREIGN PATENT DOCUMENTS

JP 06240817 A * 8/1994

OTHER PUBLICATIONS

Spanish Patent No. 2 396 639, issued Feb. 25, 2013 (Myphor Materiales Especiales S L).

* cited by examiner

*Primary Examiner* — Kelechi Egwim

(74) *Attorney, Agent, or Firm* — Gary J. Gershik; Cooper & Dunham LLP

(57) ABSTRACT

Method for manufacturing structural synthetic fibers for concretes and mortars and the synthetic fiber obtained, particularly a polyolefin-based synthetic fiber for use in concretes and mortars with a hydraulic binder as a cementing base for increasing the elastic modulus of the same which comprises the mixture of polyolefin and additives, the formation of threads, a first stretching process, an alternate series of heating-cooling, collecting the threads in coils and stabilization of the polymerization/cross-linking for two days to one week; the threads are subsequently again subjected to one or several re-stretching phases, including the heating-cooling and subsequent stabilization processes if successive re-stretching processes are going to be carried out; lastly a surface etching phase and the cutting of the threads.

13 Claims, No Drawings

METHOD FOR MANUFACTURING STRUCTURAL SYNTHETIC FIBERS FOR CONCRETES AND MORTARS AND THE SYNTHETIC FIBER OBTAINED

RELATED APPLICATIONS

This application is a §371 national stage of PCT International Application No. PCT/ES2014/070589, filed Jul. 23, 2014, claiming priority of Spanish Application No. P201331123, filed Jul. 23, 2013, the contents of each of which are hereby incorporated by reference into this application.

OBJECTIVE OF THE INVENTION

The invention, as the title of the present specification states, relates to a method for manufacturing structural synthetic fibers for concretes and mortars and to the synthetic fiber obtained, which provides various advantages and novel characteristics, for the function for which it is intended, which are described in detail further on and which involve an improved alternative to the currently known systems for the same purpose.

More particularly, the objective of the invention is centered on a new method for manufacturing, by means of extrusion, synthetic fibers intended to be added in concretes and mortars, the aim of which is to increase the elastic modulus of the same, which has been improved with respect to the industrial extrusion processes used to date, in particular, the process of applying multiple stretching processes recommended in the patent ES2396639A1, property of the same applicant, incorporating new stretching steps, which act synergistically in the process, with the aim of increasing the elastic modulus of the final product.

APPLICATION FIELD OF THE INVENTION

The application field of the present invention is framed within the sector of construction, specifically encompassing the field of the industry dedicated to manufacturing concretes and mortars, especially those which have a hydraulic binder in the formulation thereof (cement, lime, plaster or the combinations thereof) and which, principally are ready-mix and prefabricated concrete, and civil engineering.

BACKGROUND OF THE INVENTION

At present, different types of fibers are used to reinforce concretes and mortars. The fibers can provide the concrete with different properties, such as reducing cracking, improving passive resistance against fire, etc., even though the fundamental difference is the structural capacity thereof, that is to say, whether the fibers have structural character at the time of providing the concrete/mortar with mechanical features. Even though until a few years ago the only possibility of structurally reinforcing the concretes and the mortars with fibers was the use of metallic fibers, the advances in polymers have allowed for some types of synthetic fibers to be able to be considered structural fibers and, taken into account in the calculations for such purpose. In Spain, the legislation in force (EHE-80) makes reference to this differentiation, distinguishing the structural character thereof with the terms macro-fibers and micro-fibers.

Among the macro-synthetic fibers, those with a polyolefin base (polypropylene, polyethylene, etc.) are the most used, both for the competitive price thereof and for the features thereof. The improvement of the fibrillation by means of the use of mineral loads, etc., is known in the state of the art for improving different properties of the fibers, such as the adherence between the fiber and the concrete/mortar.

However, although these types of fibers have a resistance to traction in many cases greater than that of the steel itself used for reinforcing the concretes/mortars, the elastic modulus thereof is low, since the elongation at break thereof is high.

In the extrusion process (normal system for manufacturing the fibers), drawing is subsequently carried out with stretching ratios of between 1:10 and 1:20, the elastic modulus of these types of fibers can thereby be greatly improved, however, it still being insufficient in many cases for providing the features sought. In order to obtain a greater elastic modulus, an attempt can be made to increase the stretching ratio, however, industrial manufacture becomes unstable, many breakages of the thread, which the fibers form, being produced, undesirable deformations of the section of the same, etc. The deterioration which the features of the fibers can suffer may be very high if this stretching is not done in a very rigorous manner and applying complementary treatments.

In order to resolve this drawback, this applicant is the holder of the patent ES2396639A1, in which a "Method for manufacturing structural synthetic fibers for concretes and mortars for increasing the elastic modulus of the same" is disclosed, which considers that after the first stretching process, the threads are subjected to a second stretching phase, in advance of which they are heated so that they are within the softening range and in addition, or alternatively, special nanoclays with nanometric size are added to the polymer, the preferred nanoclays used being sepiolite, with a nanometric size, modified with xylans.

Although said method satisfactorily meets the intended objective, it presents certain aspects capable of being improved, the objective of the present invention being the development of a new improved method for such purpose.

DESCRIPTION OF THE INVENTION

Thus the method for manufacturing structural synthetic fibers for concretes and mortars and the synthetic fiber obtained which the present invention proposes are configured as a notable novelty within the application field thereof since in light of the implementation thereof and in a limited manner, they satisfactorily achieve the previously indicated objectives, the characterizing details being what makes this possible, conveniently included in the final claims which accompany the present specification of the same.

Specifically, what the present invention recommends is a novel industrial process or a modification of the current one, developed with the aim of increasing the elastic modulus of the resulting final fiber such that an elastic modulus always above 20 GPa (gigapascals) is obtained.

When an elastic modulus of the same order of magnitude as the compound which it should reinforce is obtained, the behavior in terms of evaluation tests of tenacity/ductility of the fiber-reinforced material is better, greater values of around 30% being obtained in the results both of energy absorption and residual resistance in comparison to the same quantity of the same type of fiber, but with a lower elastic modulus, where the new process of re-stretching, object of the invention, has not been applied.

The extrusion of the polyolefin is carried out, as normal, in the following manner:

- the mixture of polyolefin, the additions and the corresponding additives are melted and homogenized in a mixing container designed for such purpose.
- Said mixture passes through special nozzles which give the threads shape, subsequently passing through an immersion in a bath of an aqueous base solution to reduce the temperature thereof and provide the fiber threads with a greater stretching capacity.
- The threads formed in this way enter into a system, or roller trains, where a stretching process is carried out, the ratios of which can vary between 1:10 and up to 1:20. In order to achieve a high degree of stretching without breakages, apart from the bath, at the outlet of the extrusion nozzles, between the various sets of rollers, the threads are subjected to an alternate series of heating-cooling for a determined time, at very controlled temperatures and with previously tested stabilization periods.
- Subsequently the threads already stretched pass through another series of rollers where surface etching is carried out on them in order to improve the mechanical adherence with the binders.
- Lastly, the threads pass through a process of cutting to the desired length.

The process which the present invention recommends, considers the following modification:

- once the initial stretching process has been carried out at a determined temperature and without having passed through the process of surface embossing, the continuous threads are collected in coils for the stabilization thereof. The coils collected in this way are maintained for a period which can last between two days and one week, depending on the humidity and temperature conditions to which they are subjected in this phase such that the polymerization and cross-linking process of the fiber is completed as far as possible.
- After the stabilization phase, the coils are collected and the threads are again subjected to heating-cooling cycles for a determined time, at very controlled temperatures and with previously tested stabilization periods such that they are within the softening range suitable for carrying out another stretching process without matrix breakage or deterioration (around 80 to 120° C.). The preferred heating process is by means of immersion in a bath at a suitable temperature, although any other system may be feasible, such as the passage of the thread through heating plates in a special atmosphere.
- Once the fibers have passed through the previous process and at the ideal temperature, they are again passed through the stretching rollers, again producing stretching which is complementary to the one previously carried out. In this way, a new stretching process is imposed and the polymerization of the polyolefin is optimized such that a greater percentage of the molecules thereof are aligned in the direction of stretching. Furthermore, if successive re-stretching processes are going to be carried out, the processes of heating-cooling and subsequent stabilization are included.
- Subsequently, the previously mentioned processes are resumed (etching the fiber and final cutting).

The modification of the manufacturing system thus described for carrying out re-stretching in different phases allows the final elastic modulus of the fibers to be increased, avoiding the physical/chemical obstacles which limit reaching higher elastic moduli than those achieved with only one stretching. With simple extrusion process, the desired elastic moduli cannot be reached since based on the determined stretching ratio, which depends on the type of machinery used, the threads start to break and break up the continuous manufacturing process. The addition of mineral loads in the form of filler which improve the final aspect of the fiber (prevent the fibrillation and increase the surface hardness) usually make the problem of thread breakages worse in the extrusion/stretching process, and consequently the stretching ratio is normally reduced when they are added, lower final elastic moduli being obtained.

In short, the process of the present invention strives to increase the elastic modulus of the polyolefin-based synthetic fibers manufactured by means of extrusion in order to be added to concretes and mortars, modifying the industrial processes with new stretching stages, which act synergistically in the process causing the elastic modulus of the final product to increase.

Said final product is a polyolefin-based synthetic fiber for the use thereof in concretes and mortars with a hydraulic binder as the cementing base, which has been obtained by means of an extrusion and multiple stretching process, with the aim of increasing the elastic modulus to one which could not be reached by a simple extrusion/stretching process (in one single step).

With said multiple stretching process, however, an improvement of features is achieved in terms of the increase of the elastic modulus thereof and/or increase of the resistance thereof to traction and/or reduction of the elongation at break, an elastic modulus above 15 GPa being capable of being reached.

Specifically, the method recommended allows a fiber with an elastic modulus greater than 20 GPa to be obtained. Owing to this, a slope in the tension/deformation curve can be obtained, similar to the cementing compound to which it is linked, consequently the combined deformation behavior is similar up to the breakage of the compound (mortar, concrete or gunite), improved values being obtained in energy absorption tests and in residual resistance tests.

With the nature of the present invention sufficiently described, as well as the manner of putting it into practice, it is not considered necessary to make the explanation thereof more extensive in order for any person skilled in the art to understand the scope thereof and the advantages which are derived from it, it being stated that within the essence thereof, it can be carried out in practice in other embodiments which differ in detail from that indicated by way of example and to which the protection claimed similarly extends, provided the fundamental principle thereof is not altered, changed or modified.

The invention claimed is:

1. A method for manufacturing structural synthetic fibers for concretes and mortars which is applicable particularly to a polyolefin-based synthetic fiber for the use thereof in concretes and mortars with a hydraulic binder as a cementing base and increasing the elastic modulus of the same, and comprising the mixture of polyolefin and additives, the formation of threads, a first stretching process, an alternate series of heating-cooling, surface etching and the cutting the threads, is characterized in that once the initial stretching process has been carried out at a determined temperature and before having passed through the process of surface embossing, the continuous threads are subjected to a stabilization phase where they are collected in coils which are maintained for a period of between two days to one week so that they are stabilized and the polymerization and cross-linking process of the fiber is completed; and after the stabilization phase, the coils are collected and the threads are again subjected to heating-cooling and stretching cycles.

2. The method for manufacturing structural synthetic fibers for concretes and mortars according to claim 1, characterized in that the threads are brought to temperatures from 80 to 120° C. in the heating-cooling cycles after the stabilization period.

3. The method for manufacturing structural synthetic fibers for concretes and mortars according to claim 2, characterized in that the heating process is by means of immersion bath.

4. The method for manufacturing structural synthetic fibers for concretes and mortars according to claim 2, characterized in that the heating process is by means of the passage of the thread between heating plates in a special atmosphere.

5. The method for manufacturing structural synthetic fibers for concretes and mortars according to claim 1, characterized in that once the fibers have passed through the stabilization and heating-cooling process at the ideal temperature, they are again subjected to stretching.

6. The method for manufacturing structural synthetic fibers for concretes and mortars according to claim 1, characterized in that if successive re-stretching is going to be carried out, when the threads are subjected to one or several re-stretching phases, the heating-cooling and subsequent stabilization processes are included.

7. A synthetic fiber for the use thereof in concretes and mortars with a hydraulic binder as a cementing base, obtained according to a method of manufacturing like the one described in claim 1.

8. The method for manufacturing structural synthetic fibers for concretes and mortars according to claim 2, characterized in that once the fibers have passed through the stabilization and heating-cooling process at the ideal temperature, they are again subjected to stretching.

9. The method for manufacturing structural synthetic fibers for concretes and mortars according to claim 3, characterized in that once the fibers have passed through the stabilization and heating-cooling process at the ideal temperature, they are again subjected to stretching.

10. The method for manufacturing structural synthetic fibers for concretes and mortars according to claim 4, characterized in that once the fibers have passed through the stabilization and heating-cooling process at the ideal temperature, they are again subjected to stretching.

11. The method for manufacturing structural synthetic fibers for concretes and mortars according to claim 2, characterized in that if successive re-stretching is going to be carried out, when the threads are subjected to one or several re-stretching phases, the heating-cooling and subsequent stabilization processes are included.

12. The method for manufacturing structural synthetic fibers for concretes and mortars according to claim 3, characterized in that if successive re-stretching is going to be carried out, when the threads are subjected to one or several re-stretching phases, the heating-cooling and subsequent stabilization processes are included.

13. The method for manufacturing structural synthetic fibers for concretes and mortars according to claim 4, characterized in that if successive re-stretching is going to be carried out, when the threads are subjected to one or several re-stretching phases, the heating-cooling and subsequent stabilization processes are included.

* * * * *